(12) United States Patent
Wang

(10) Patent No.: US 11,730,139 B2
(45) Date of Patent: Aug. 22, 2023

(54) AUTOMATIC FEEDING DEVICE

(71) Applicant: VIVOTEK INC., New Taipei (TW)

(72) Inventor: Ming-Wei Wang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 163 days.

(21) Appl. No.: 17/406,069

(22) Filed: Aug. 18, 2021

(65) Prior Publication Data

US 2022/0132799 A1    May 5, 2022

(30) Foreign Application Priority Data

Oct. 30, 2020   (TW) .................... 109137898

(51) Int. Cl.
*A01K 5/02* (2006.01)

(52) U.S. Cl.
CPC .......... *A01K 5/0225* (2013.01); *A01K 5/0291* (2013.01)

(58) Field of Classification Search
CPC .. A01K 5/0225; A01K 5/0291; A01K 5/0233; A01K 5/0241; A01K 5/0258; A01K 5/0275; A01K 5/025
USPC ....................................................... 119/57.91
See application file for complete search history.

(56) References Cited

U.S. PATENT DOCUMENTS

| | | | | |
|---|---|---|---|---|
| 1,967,022 A * | 7/1934 | Chandler | ................ | B02C 25/00 119/51.5 |
| 3,796,349 A * | 3/1974 | Weber | .................... | G01G 13/22 177/DIG. 5 |
| 4,079,699 A * | 3/1978 | Longmore | ................ | A01K 7/02 119/51.5 |
| 4,890,577 A * | 1/1990 | Maibach | ................... | A01K 5/02 119/52.1 |
| 5,735,231 A * | 4/1998 | Terenzi | ................ | A01K 5/0291 119/51.11 |
| 5,782,201 A * | 7/1998 | Wells | ....................... | A01K 5/02 119/57.4 |
| 5,794,560 A * | 8/1998 | Terenzi | ................ | A01K 5/0291 119/51.11 |

(Continued)

FOREIGN PATENT DOCUMENTS

| CN | 208402848 U | 1/2019 |
|---|---|---|
| CN | 109548700 A | 4/2019 |

(Continued)

*Primary Examiner* — Ebony E Evans
(74) *Attorney, Agent, or Firm* — Winston Hsu (57) ABSTRACT

An automatic feeding device includes an accommodating container, a transmission channel, a valve unit, a sensor and an ejection unit. The transmission channel is disposed on bottom of the accommodating container. The transmission channel has an inlet portion, a central portion and an outlet portion. The central portion is between the inlet portion and the outlet portion. The valve unit is disposed on the bottom of the accommodating container and adjacent to the inlet portion. The valve unit is switchable to allow feed inside the accommodating container for passing the inlet portion and entering the transmission channel. The sensor is disposed on the inlet portion and detects whether the feed passes the inlet portion, and further outputs a control command to switch modes of the valve unit. The ejection unit is disposed on the central portion and used to push the feed inside the transmission channel toward the outlet portion.

17 Claims, 6 Drawing Sheets

(56) References Cited

U.S. PATENT DOCUMENTS

| | | | |
|---|---|---|---|
| 6,789,503 B1* | 9/2004 | Gao ..................... | A01K 5/0291 |
| | | | 119/51.11 |
| 7,984,694 B2* | 7/2011 | Wu ..................... | A01K 5/0291 |
| | | | 119/51.02 |
| 2022/0079115 A1* | 3/2022 | Tsai ..................... | A01K 5/0275 |

FOREIGN PATENT DOCUMENTS

| | | | | |
|---|---|---|---|---|
| TW | M496344 U | 3/2015 | | |
| WO | WO-2013003273 A2 * | 1/2013 | ........... | A01K 5/0241 |

* cited by examiner

AUTOMATIC FEEDING DEVICE

BACKGROUND OF THE INVENTION

1. Field of the Invention

The present invention relates to an automatic feeding device, and more particularly, to an automatic feeding device capable of accurately controlling a throwing amount of the feed.

2. Description of the Prior Art

In Taiwan Patent No., M507294, the conventional pet interaction device accommodates an object I in a sunken slot 110 of the housing, and a pushing component 700 is disposed on a bottom of the sunken slot 110 and used to move upward in accordance with an external command. The object I, which may be feed or toys, accommodated in the sunken slot 110 is stacked up and close to a lateral opening on a connecting component 500 by upward motion of the pushing component 700, and then is dropped into another connecting component 600 disposed under the connecting component 500 via gravity. For ejecting the object I, a compressed spring S is released, and a resilient recovering force of the spring S drives a pushing component 800 to hit and throw the object I out of the connecting component 600. However, the conventional pet interaction device cannot decide a number of the object I moved from the sunken slot 110 to the connecting component 500 by each motion of the pushing component 700, and the number of the object I thrown out of the housing cannot be accurately controlled by the pushing component 800. Besides, the object I is easily damaged because the pushing component 800 cannot adjust its hitting force applied for the object I; if the object I is split, an ejection distance of the object I thrown out of the conventional pet interaction device cannot be decided by the pushing component 800, which makes drawbacks of the conventional pet interaction device.

SUMMARY OF THE INVENTION

The present invention provides an automatic feeding device capable of accurately controlling a throwing amount of the feed for solving above drawbacks.

According to the claimed invention, an automatic feeding device includes an accommodating container, a transmission channel, a valve unit, a first sensor and an ejection unit. The accommodating container is adapted to accommodate feed. The transmission channel is disposed on a bottom of the accommodating container. The transmission channel has an inlet portion, a central portion and an outlet portion. The central portion is located between the inlet portion and the outlet portion. The valve unit is disposed on the bottom of the accommodating container and adjacent to the inlet portion. The valve unit is switchable to allow the feed inside the accommodating container for passing the inlet portion and entering the transmission channel. The first sensor is disposed on the inlet portion and adapted to detect whether the feed passes the inlet portion, so as to accordingly output a control command for switching operation modes of the valve unit. The ejection unit disposed on the central portion and adapted to push the feed inside the transmission channel toward the outlet portion.

The automatic feeding device of the present invention can utilize several sensors to respectively detect whether the feed are moved from the accommodating container to the transmission channel and whether the feed is correctly dropped onto the ejection unit inside the transmission channel. The automatic feeding device of the present invention can accurately control the feed amount, and further can ensure the feed individually thrown out of the automatic feeding device to prevent the transmission channel from being blocked and further prevent the feed from being broken.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
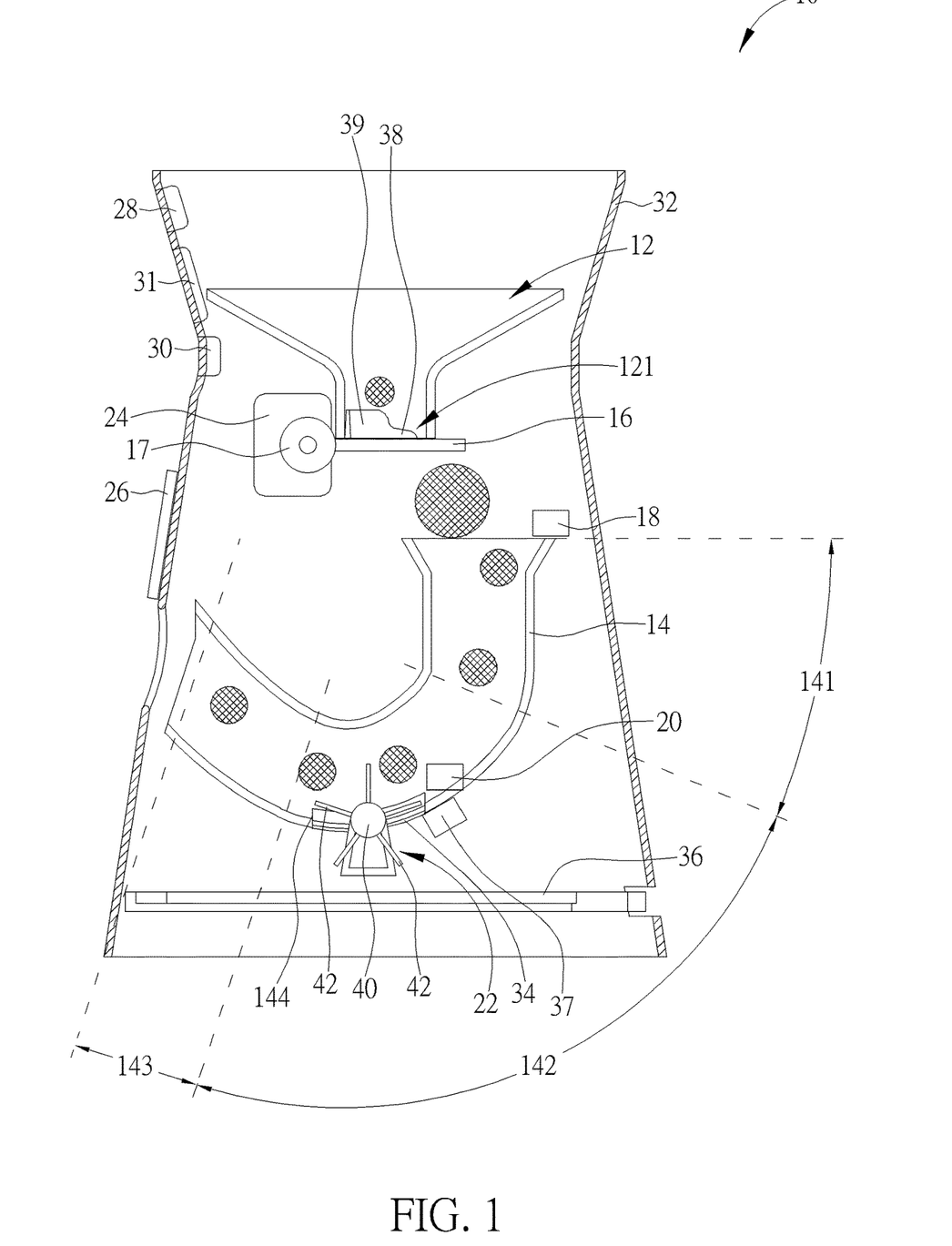
FIG. 1 and FIG. 2 are sectional views of an automatic feeding device in different operation modes according to a first embodiment of the present invention.
Figure 2:
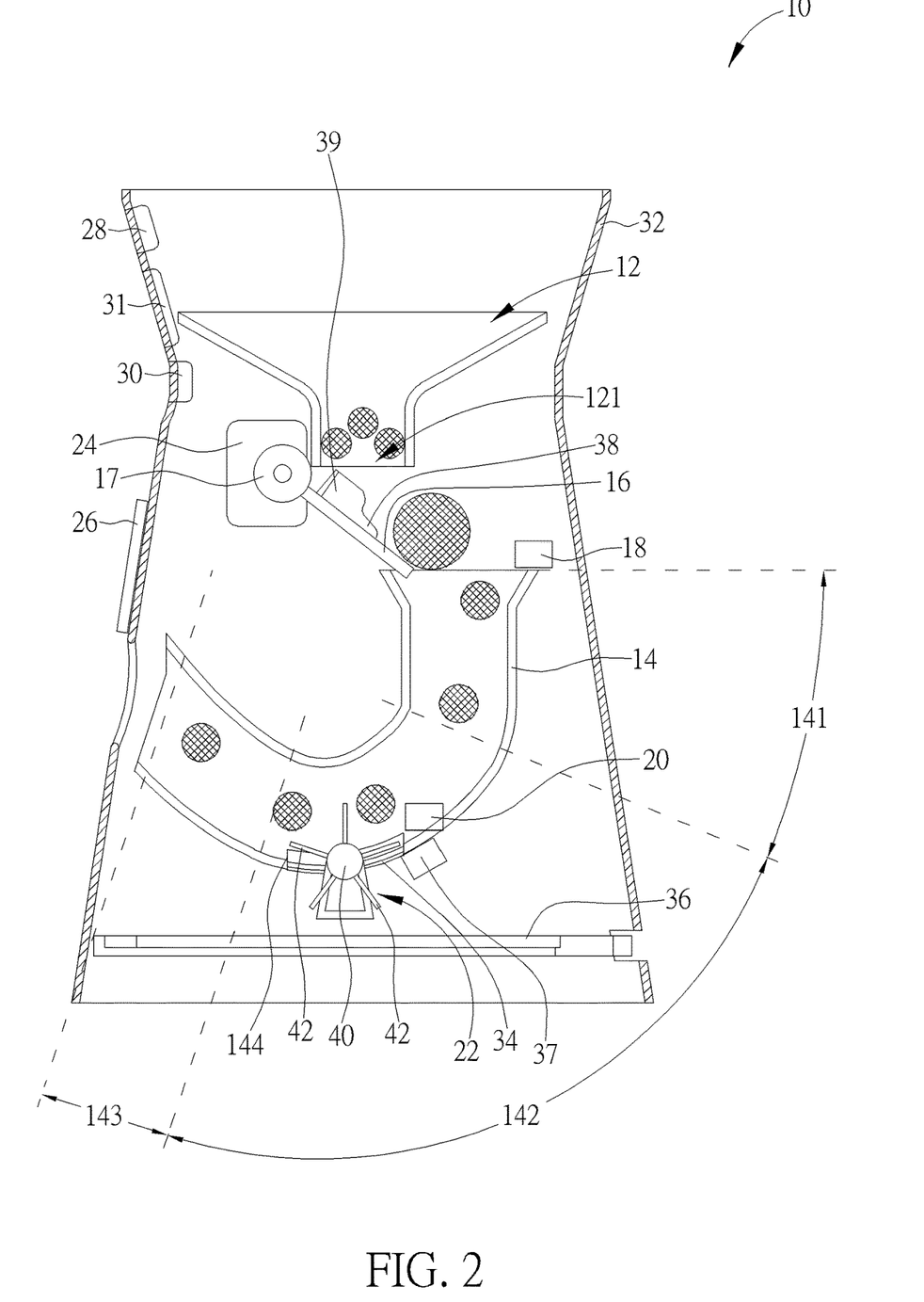

Please refer to FIG. 1 and FIG. 2. FIG. 1 and FIG. 2 are sectional views of an automatic feeding device 10 in different operation modes according to a first embodiment of the present invention. The automatic feeding device 10 can have a remote control function; when the user goes out, the automatic feeding device 10 set in the house can be controlled via a portable communication device to throw feed or toys, for interaction with the pet stayed in the house. As an example of the feed, the automatic feeding device 10 of the present invention may have several sensors, which can accurately control an ejecting amount of the feed to prevent the pet from over-eating, and further can detect whether the feed is thrown one by one to avoid the feed from being blocked in a channel or from surplus.

The automatic feeding device 10 can include an accommodating container 12, a transmission channel 14, a valve unit 16, a first sensor 18, a second sensor 20, an ejection unit 22, a signal receiver 24, a door 26, alarm 28 and a webcam 30 disposed inside or outside a housing 32. The first sensor 18 can be an inlet sensor and the second sensor 20 can be a central sensor. The accommodating container 12 can accommodate the feed or the toy. An opening 121 can be formed on a bottom of the accommodating container 12. The valve unit 16 can be disposed on the bottom of the accommodating container 12 for sheltering or exposing the opening 121. The transmission channel 14 can be disposed on the bottom of the accommodating container 12 and adjacent to the valve unit 16. The transmission channel 14 can include an inlet portion 141, a central portion 142 and an outlet portion 143. The central portion 142 can be located between the inlet portion 141 and the outlet portion 143.

In addition, the first sensor 18 can be disposed on the inlet portion 141 of the transmission channel 14, and used to detect whether the feed passes the inlet portion 141 and enters the transmission channel 14. The operation mode of the valve unit 16 can be switched in accordance with a detection result of the first sensor 18. The ejection unit 22 can be disposed on the central portion 142. The second sensor 20 can be disposed on the central portion 142 and close to the ejection unit 22. The ejection unit 22 can determine whether to eject the feed in accordance with a detection result of the second sensor 20. The door 26 can be disposed out of the housing 32, or can be disposed inside the housing 32 and close to the outlet portion 143. The door 26 can shelter the outlet portion 143 of the transmission channel 14 when the automatic feeding device 10 does not throw the feed, to prevent an insect from crawling into the housing 32 due to attraction of the feed. The alarm 28 can be disposed on an upper side of the housing 32, or disposed on the outlet portion 143 of the transmission channel 14. The alarm 28 can output alarm information, such an acoustic signal or a flash signal. The alarm 28 may be a speaker, a light source, or a combination of the speaker and the light source, or any component capable of outputting the acoustic signal or the flash signal. In one possible embodiment, a sound message can be pre-recorded, and the automatic feeding device 10 can output the sound message before or when the feed is thrown, so that the pet can be attracted to move toward the automatic feeding device 10 for eating the feed.

The first sensor 18 can detect whether the feed passes the inlet portion 141 via optical detection technology or any other detection technology, which depends on an actual demand. The first sensor 18 can determine whether the feed passing the inlet portion 141 conforms to a predefined condition. The predefined condition may be an amount or a continuous period of the feed passing the inlet portion 141. If the feed passing the inlet portion 141 conforms to the predefined condition, which means the amount of the feed dropped from the accommodating container 12 conforms to the user's demand, the first sensor 18 can output a control command to switch the valve unit 16 from an opening operation mode to a closing operation mode, for shutting down the opening 121 of the accommodating container 12, as shown in FIG. 1. If the feed passing the inlet portion 141 does not conform to the predefined condition, which means the amount of the feed dropped from the accommodating container 12 does not conform to the user's demand, the valve unit 16 can be kept in the opening operation mode, as shown in FIG. 2; the valve unit 16 can be switched to the closing operation mode to avoid the feed from dropping into the transmission channel 14 until the feed amount in the transmission channel 14 conforms to the predefined condition.

The first sensor 18 and the second sensor 20 can be applied by the same or different detection technology. The second sensor 20 can detect whether the feed enters the central portion 142. Although the first sensor 18 can detect whether the feed enters the transmission channel 14, the feed may be blocked in the inlet portion 141, and the ejection unit 22 may be idled if being actuated. Thus, the present invention can utilize the second sensor 20 to detect the feed enters the central portion 142, and then actuate the ejection unit 22 to push the feed from the central portion 142 to the outlet portion 143. When the second sensor 20 does not detect the feed entering the central portion 142, the ejection unit 22 cannot be actuated to economize energy consumption and minimize unnecessary noise, and the pet may be not confused by hearing mechanical noise but not feed throwing from the automatic feeding device 10.

The present invention can design the transmission channel 14 as a curved structure. The inlet portion 141 and the outlet portion 143 can be two opposite ends of the curved structure, and the central portion 142 can be a bending portion of the curved structure. A height of the inlet portion 141 relative to a bottom surface of the housing 32 can be greater than a height of the central portion 142 relative to the bottom surface of the housing 32. When the feed is moved from the accommodating container 12 into the inlet portion 141 of the transmission channel 14, the feed can be dropped into the central portion 142 via gravity, and the ejection unit 22 can throw the feed out of the automatic feeding device 10 along a parabolic curve; thus, a height of the outlet portion 143 relative to the bottom surface of the housing 32 can be greater than the height of the central portion 142 relative to the bottom surface of the housing 32, and the feed thrown out of the automatic feeding device 10 along the predefined parabolic curve can be fallen into a predefined range on the ground.

Besides, the signal receiver 24 may have a wireless transmission function, and can be electrically connected to the webcam 30 and a driver 17 of the valve unit 16. The driver 17 can be a power source for switching the valve unit 16 between the opening operation mode and the closing operation mode. The webcam 30 can capture surveillance images and transmit the surveillance images to the portable communication device hold by the user via the signal receiver 24, so that the user can watch the pet's condition stayed in the house. In other possible embodiment, the automatic feeding device 10 may further include a display unit 31 electrically connected to the signal receiver 24 and used to display an image captured by a camera of the portable communication device. The display unit 31 can be cooperated with the alarm 28, and the user can show his/her video and audio information for remote interaction with the pet. If the user cannot capture the immediate image by the camera of the portable communication device, the display unit 31 and the alarm 28 may display the pre-recorded video and audio information.

In other possible embodiment, the automatic feeding device 10 may further include a timer (not shown in the figures). If the user cannot remote control the automatic feeding device 10, the automatic feeding device 10 can be set to throw the feed at a specific point of time via the timer; accordingly, the automatic feeding device 10 may display the recorded video and audio information at the specific point of time via the timer. The signal receiver 24 can further receive an external command input by the portable communication device, and accordingly drive the valve unit 16 to switch its operation mode. The external command may request the valve unit 16 immediately switched into the opening operation mode for throwing the feed to interact with the pet. Moreover, the external command may set an opening amplitude and/or an opening period of the valve unit 16 in the opening operation mode, such a maximal angle or a minimal angle of the valve to control the throwing amount of the feed, or a long opening period or a short opening period of the value to control the total amount of the throwing feed.

Besides, the transmission channel 14 can further include a sieve 34 disposed above a hole 144 on the bottom surface of the central portion 142. The ejection unit 22 can insert into the hole 144 to partly enter the central portion 142 of the transmission channel 14, for contacting and pushing the feed inside the transmission channel 14. The sieve 34 can seal a gap between the ejection unit 22 and the hole 144. A dimension and a number of apertures on the sieve 34 can depend on an actual demand, and a detailed description is omitted herein for simplicity. Fragments of the feed can be discarded away via the sieve 34, and the ejection unit 22 can push the feed with a specific size out of the transmission channel 14. Accordingly, a carrying plate 36 can be disposed under the sieve 34 and detachably assembled with the bottom surface inside the housing 32. The carrying plate 36 can carry the feed passing the sieve 34 and leaving the transmission channel 14, and the user can manually pull out the carrying plate 36 for dumping the fragments of the feed, so as to clean the automatic feeding device 10. In other possible embodiment, the automatic feeding device 10 may further include a vibration unit 37 electrically connected to the signal receiver 24. The vibration unit 37 can vibrate the sieve 34 by remote control of the user, so as to shake the fragments of the feed out of the sieve 34 and dropping into the carrying plate 36.

Figure 3:
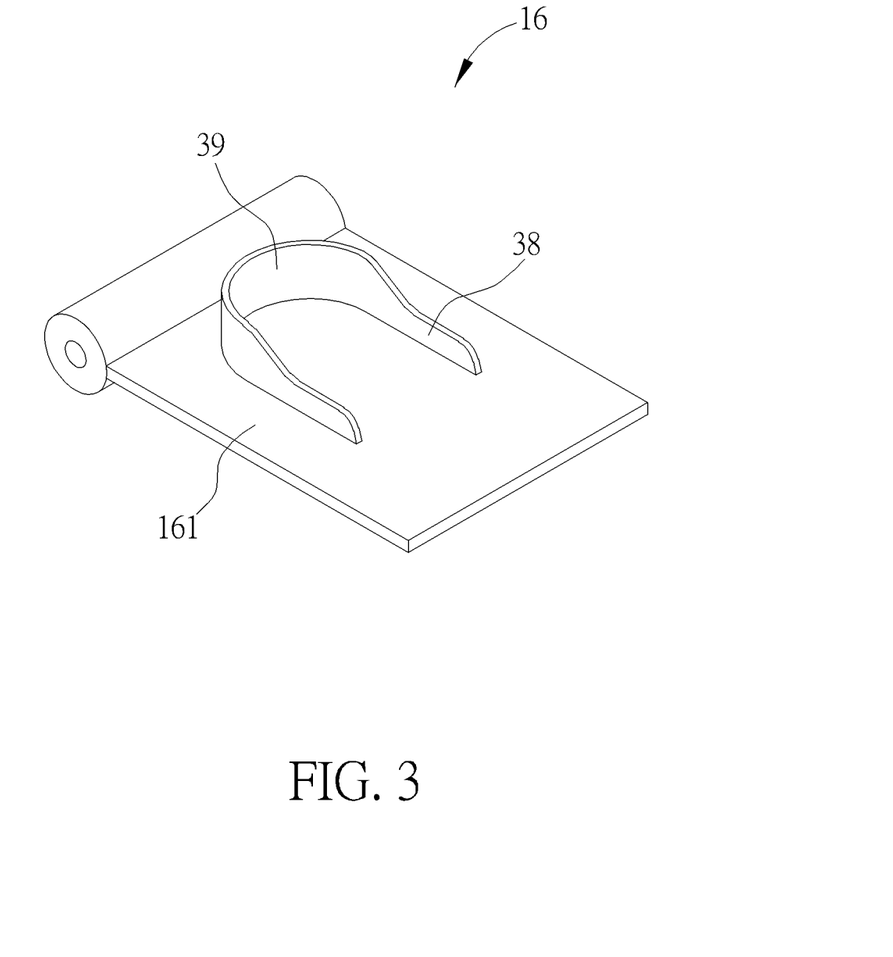
FIG. 3 is a diagram of a valve unit according to the embodiment of the present invention.

Please refer to FIG. 3. FIG. 3 is a diagram of the valve unit 16 according to the embodiment of the present invention. The valve unit 16 can include a track structure 38 and a protruding structure 39 disposed on a plate 161 of the valve unit 16. The track structure 38 can be formed on a surface of the plate 161, and the protruding structure 39 can be stretched from a side of the track structure 38 to establish a flow path, for ensuring the feed can be moved along the flow path provided by the track structure 38 and the protruding structure 39 when the valve unit 16 is switched into the opening operation mode; which means a moving direction of the feed can be constrained by the track structure 38 and the protruding structure 39, and thus the feed leaving the opening 121 of the accommodating container 12 can be accurately dropped into the transmission channel 14 through the track structure 38. A height of the track structure 38 can be preferably smaller than a height of the protruding structure 39. In some situations, the feed may be blocked in the opening 121 and unable to drop off; if the valve unit 16 is switched on but the first sensor 18 does not detect the feed passing the inlet portion 141, the feed is blocked and the first sensor 18 can switch the valve unit 16 from the opening operation mode to the closing operation mode and then back to the opening operation mode, so that the blocked feed can be released by the protruding structure 39 inserting into the opening 121, and therefore the feed can be smoothly dropped into the transmission channel 14.

In the first embodiment, the ejection unit 22 can include an electric motor 40 and a plurality of blades 42. When the feed enters the central portion 142 of the transmission channel 14, the feed may be dropped onto the blades 42 via the gravity. The ejection unit 22 can be actuated to rotate the plurality of blades 42 by the electric motor 40, and the feed dropped onto the blades 42 can be pushed toward the outlet portion 143 and thrown out of the transmission channel 14 due to a centrifugal force. A rotation speed of the electric motor 40 and a dimension of the blade 42 can be designed in accordance with the actual demand, such as a predefined throwing distance and/or a size of the feed, and a detailed description is omitted herein for simplicity.

Figure 4:
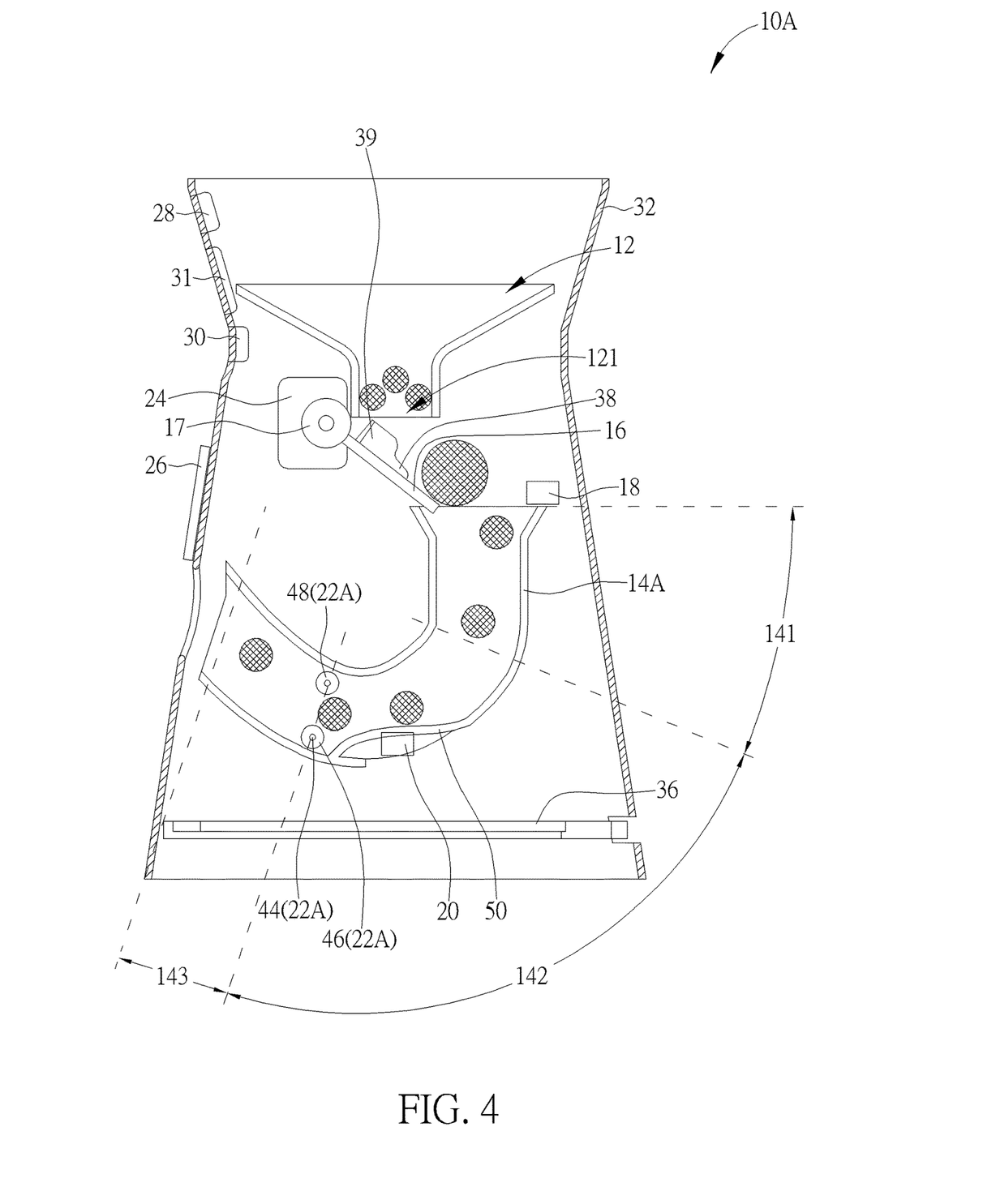
FIG. 4 is a sectional view of the automatic feeding device according to a second embodiment of the present invention.

Please refer to FIG. 4. FIG. 4 is a sectional view of the automatic feeding device 10A according to a second embodiment of the present invention. In the second embodiment, elements having the same numerals as ones of the first embodiment have the same structures and functions. The automatic feeding device 10A can utilize the ejection unit 22A to throw the feed, and the ejection unit 22A can include an electric motor 44 and two wheels 46 and 48. The wheel 46 can be a driving wheel electrically connected to the electric motor 44. The wheel 48 can be a passive wheel disposed on a position corresponding to the wheel 46, and may be slidably assembled with a specific track (which is not shown in the figures). When the feed is dropped onto the central portion 142 of the transmission channel 14, the electric motor 44 can drive rotation of the wheel 46, and the feed clipped between the wheels 46 and 48 can be pushed toward the outlet portion 143 via a friction force generated by the wheels 46 and 48.

If the size of the feed is greater than an interval between the wheels 46 and 48, the wheel 48 can be moved along the specific track when clipping the feed, which means the interval between the wheels 46 and 48 can be accordingly adjusted to pass the feed smoothly through space between the wheels 46 and 48 for throwing out of the transmission channel 14. Besides, the automatic feeding device 10A can optionally dispose a guiding surface structure 50 on the central portion 142 of the transmission channel 14A in accordance with the size of the wheel 46. The guiding surface structure 50 can guide the feed to accurately slide or roll into the space between the wheels 46 and 48, and therefore the ejection unit 22A can clip and throw the feed out of the transmission channel 14A.

Figure 5:
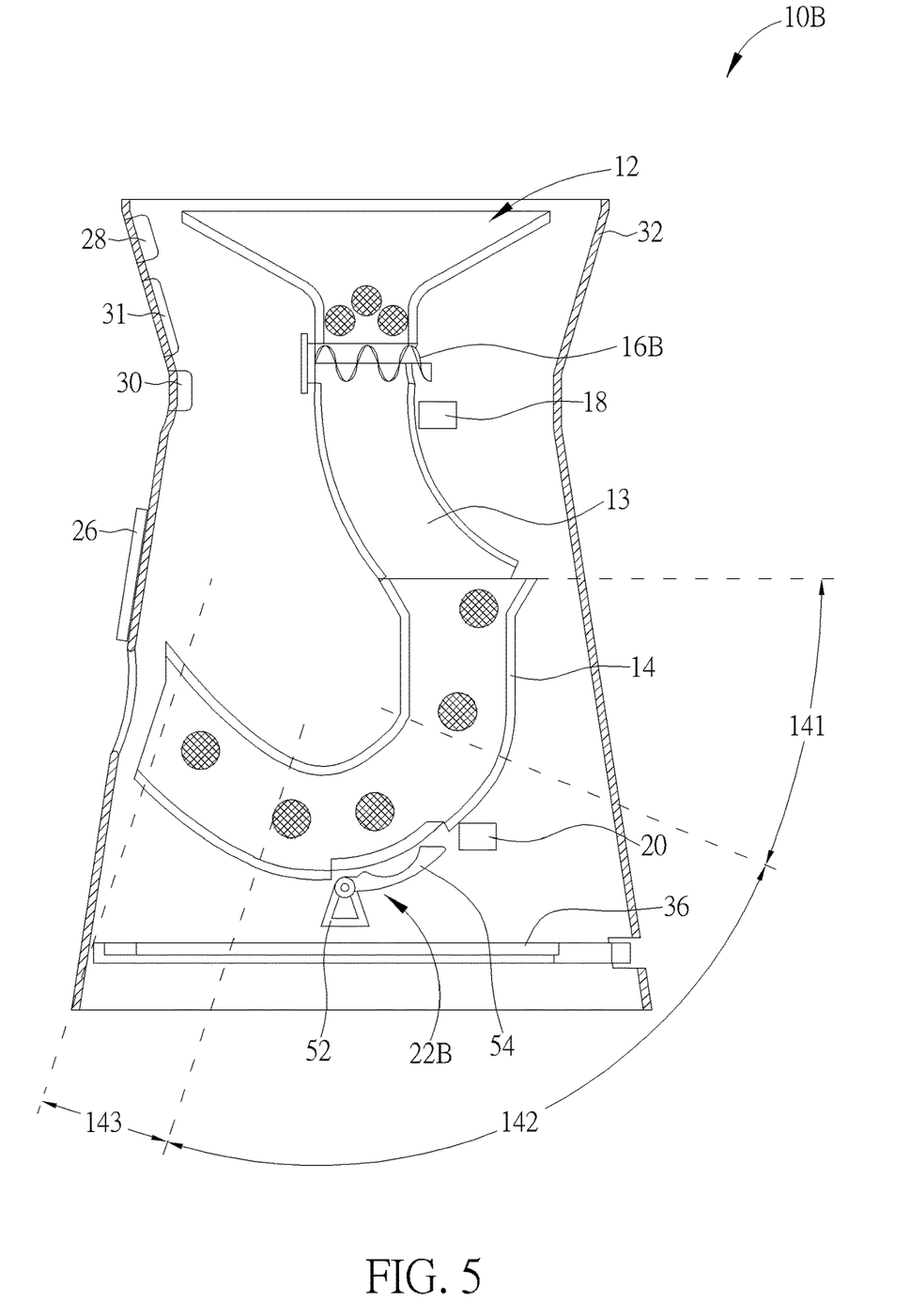
FIG. 5 is a sectional view of the automatic feeding device according to a third embodiment of the present invention.

Please refer to FIG. 5. FIG. 5 is a sectional view of the automatic feeding device 10B according to a third embodiment of the present invention. In the third embodiment, elements having the same numerals as ones of the above-mentioned embodiments have the same structures and functions. The valve unit 16B of the automatic feeding device 10B can be a screw bar structure. The screw bar structure of the valve unit 16B can have fillisters between threads of the screw bar for holding the feed. The feed can be dropped out of the accommodating container 12 sequentially in accordance with rotation of the valve unit 16B. The valve unit 16B can effectively prevent the feed from being blocked in the opening 121 of the accommodating container 12, and further can accurately eject the feed in the needed amount. In another possible embodiment of the present invention, the valve unit 16 of the automatic feeding device 10 can further be at least one holding blade used to hold the feed. The opening operation mode and the closing operation mode may represent that the driver 17 controls rotation and cease of the holding blade, so that the feed can be dropped onto the holding blade, and then the feed on the holding blade can fall to pass through the inlet portion 141 and enter the transmission channel 14.

The automatic feeding device 10B may dispose a connection hose 13 between the accommodating container 12 and the transmission channel 14. The first sensor 18 may be disposed on an inlet of the connection hose 13 to detect the dropping amount of the feed, and position of the first sensor 18 is not limited to the above-mentioned embodiment. In other possible embodiment, the connection hose 13 may be removed, and the opening 121 of the accommodating container 12 can directly align with to connect the inlet portion 141 of the transmission channel 14, and an application and an existence of the connection hose 13 are not limited to the above-mentioned embodiment, which depend on the design demand. In addition, the automatic feeding device 10B can utilize the ejection unit 22B to throw out the feed. The ejection unit 22B can include an electric motor 52 and a loading plate 54. The loading plate 54 can be levelly or obliquely put on the central portion 142 of the transmission channel 14, and can be moved relative to the transmission channel 14 by the electric motor 52. The feed moved into the transmission channel 14 can be dropped onto the loading plate 54 via the gravity. The electric motor 52 can drive a movement or rotation of the loading plate 54 in accordance with a detection result of the second sensor 20. The loading plate 54 rotated in a counterclockwise direction can push the feed toward the outlet portion 143 for throwing out of the automatic feeding device 10B.

Figure 6:
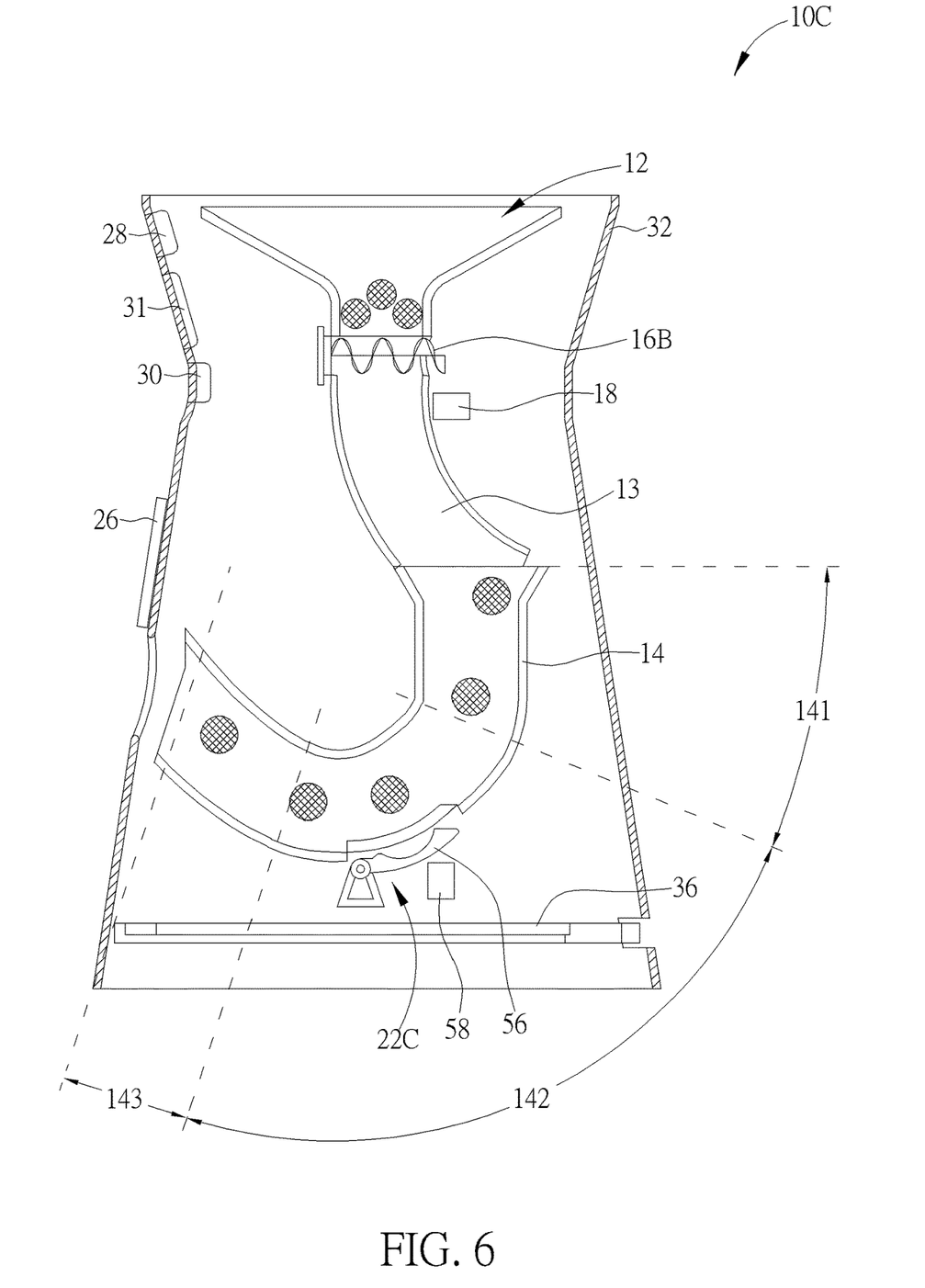
FIG. 6 is a sectional view of the automatic feeding device according to a fourth embodiment of the present invention.

Please refer to FIG. 6. FIG. 6 is a sectional view of the automatic feeding device 10C according to a fourth embodiment of the present invention. In the fourth embodiment, elements having the same numerals as ones of the above-mentioned embodiments have the same structures and functions. The ejection unit 22C of the automatic feeding device 10C may utilize compression air or a compressed spring to throw the feed out of the automatic feeding device 10C. The ejection unit 22C can include a loading plate 56 and a pushing unit 58. The loading plate 56 can be moved relative to the transmission channel 14 in a rotatable manner or in a shiftable manner. The pushing unit 58 may have the compression air or the compressed spring disposed on the bottom surface of the loading plate 56. When the second sensor 20 actuates the ejection unit 22C, the pushing unit 58 can push the loading plate 56 by releasing pressure of the compression air or the compressed spring, and the feed dropped onto the loading plate 56 can be pushed to the outlet portion 143 for throwing out of the automatic feeding device 10C.

In conclusion, the automatic feeding device of the present invention can utilize several sensors to respectively detect whether the feed are moved from the accommodating container to the transmission channel and whether the feed is correctly dropped onto the ejection unit inside the transmission channel. The structural unit disclosed in one of the embodiments can be applied for another embodiment of the present invention; for example, the ejection unit utilizing the centrifugal force in the first embodiment can be used in other embodiments, and the wheel-type ejection unit in the second embodiment can be used in other embodiments, and the connection hose and the valve unit having the screw bar in the third embodiment can be used in other embodiments. The automatic feeding device of the present invention can accurately control the feed amount, and further can ensure the feed individually thrown out of the automatic feeding device to prevent the transmission channel from being blocked and further prevent the feed from being broken.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic feeding device, comprising:
   an accommodating container adapted to accommodate feed;
   a transmission channel disposed on a bottom of the accommodating container, the transmission channel having an inlet portion, a central portion and an outlet portion, the central portion being located between the inlet portion and the outlet portion, wherein a height of an opening formed on the outlet portion relative to a bottom surface of the automatic feeding device is greater than a height of a bottom of the central portion relative to the foresaid bottom surface;
   a valve unit disposed on the bottom of the accommodating container and adjacent to the inlet portion, the valve unit being switchable to allow the feed inside the accommodating container for passing the inlet portion and entering the transmission channel; and
   an ejection unit disposed on the central portion and adapted to upwardly push the feed inside the transmission channel toward the opening of the outlet portion.

2. The automatic feeding device of claim 1, further comprising:
   a signal receiver electrically connected to the valve unit, the valve unit being switched from a closing operation mode to an opening operation mode in accordance with an external command acquired by the signal receiver.

3. The automatic feeding device of claim 2, wherein the automatic feeding device sets an opening amplitude and an opening period of the valve unit in the opening operation mode in accordance with the external command.

4. The automatic feeding device of claim 1, further comprising:
   an inlet sensor disposed on the inlet portion and adapted to detect whether the feed passes the inlet portion, so as to accordingly output a control command for switching operation modes of the valve unit.

5. The automatic feeding device of claim 4, wherein when the inlet sensor detects the feed passing the inlet portion conforms to a predefined condition, the valve unit is switched from an opening operation mode to a closing operation mode.

6. The automatic feeding device of claim 5, wherein the predefined condition is an amount or a continuous period of the feed passing the inlet portion.

7. The automatic feeding device of claim 4, further comprising:
   a central sensor disposed on the central portion and adapted to detect whether the feed enters the central portion, so as to determine whether to actuate the ejection unit in accordance with a detection result of the central sensor.

8. The automatic feeding device of claim 1, wherein the transmission channel is disposed inside a housing of the automatic feeding device, the transmission channel is a curved structure, the central portion is a bending portion of the curved structure, a height of the inlet portion relative to a bottom surface of the housing and a height of the outlet portion relative to the bottom surface are greater than a height of the central portion relative to the bottom surface.

9. The automatic feeding device of claim 1, wherein the transmission channel comprises a sieve disposed on the central portion, and a carrying plate is disposed under the sieve and adapted to carry the feed penetrating through the sieve and leaving the transmission channel.

10. The automatic feeding device of claim 1, wherein the ejection unit comprises an electric motor and a plurality of blades, the electric motor drives rotation of the plurality of blades, so that the feed dropped on each blade is pushed to the outlet portion.

11. The automatic feeding device of claim 1, wherein the ejection unit comprises an electric motor and at least two wheels, the electric motor drives rotation of a driving wheel of the at least two wheels, so that the feed clipped by the at least two wheels is pushed to the outlet portion.

12. The automatic feeding device of claim 1, wherein the ejection unit comprises an electric motor and a loading plate, the electric motor drives a movement of the loading plate relative to the transmission channel, so that the feed dropped on the loading plate is pushed to the outlet portion.

13. The automatic feeding device of claim 1, wherein the ejection unit comprises a loading plate and a pushing unit, the pushing unit has compression air or a compressed spring, and the ejection unit drives the pushing unit to release the compression air or the compressed spring to push the loading plate so as to push the feed out of the outlet portion.

14. The automatic feeding device of claim 1, further comprising:

a door disposed on a housing of the automatic feeding device and adapted to shelter the outlet portion of the transmission channel.

15. The automatic feeding device of claim 1, further comprising:
an alarm adapted to output alarm information when the feed passes the outlet portion.

16. The automatic feeding device of claim 1, wherein the valve unit comprises a track structure adapted to constrain a moving direction of the feed.

17. The automatic feeding device of claim 1, wherein the valve unit comprises a protruding structure adapted to insert into an opening of the accommodating container for pushing the feed inside the accommodating container when the opening is shut down by the valve unit.

* * * * *